United States Patent [19]
Skelly et al.

[11] Patent Number: 5,419,971
[45] Date of Patent: May 30, 1995

[54] ENHANCED THERMAL BARRIER COATING SYSTEM

[75] Inventors: David W. Skelly, Burnt Hills, N.Y.; Bangalore A. Nagaraj, West Chester, Ohio; David J. Wortman, Hamilton, Ohio; David V. Rigney, Cincinnati, Ohio; Seetha R. Mannava, Cincinnati, Ohio; Rudolfo Viguie, Cincinnati, Ohio; Robert W. Bruce, Loveland, Ohio; Warren A. Nelson, Cincinnati, Ohio; Curtis A. Johnson, Schenectady, N.Y.; Bhupendra K. Gupta, Cincinnati, Ohio

[73] Assignee: General Electric Company, Cincinnati, Ohio

[21] Appl. No.: 25,455

[22] Filed: Mar. 3, 1993

[51] Int. Cl.⁶ .............................................. B32B 3/30
[52] U.S. Cl. .................................. 428/612; 428/632; 428/633; 428/687; 428/161; 428/164; 428/172
[58] Field of Search ............... 428/609, 612, 687, 632, 428/161, 164, 172, 633

[56] References Cited

U.S. PATENT DOCUMENTS

| | | | |
|---|---|---|---|
| 2,157,456 | 5/1939 | Koyemann | 428/608 |
| 3,006,782 | 10/1961 | Wheildon | 428/632 |
| 3,031,330 | 4/1962 | Hornick | 428/612 |
| 3,290,233 | 12/1966 | Hay et al. | 428/469 |
| 3,419,414 | 12/1968 | Marks | 428/612 |
| 3,440,388 | 4/1969 | Otstot et al. | 219/69 |
| 3,503,804 | 3/1970 | Schneider | 134/1 |
| 3,588,439 | 6/1971 | Heller et al. | 219/121 |
| 3,649,806 | 3/1972 | Konig | 219/121 EM |
| 3,657,510 | 4/1972 | Rothrock | 219/121 LA |
| 4,055,705 | 10/1977 | Stecura et al. | 428/633 |
| 4,063,063 | 12/1977 | Funck et al. | 219/121 LM |
| 4,095,003 | 6/1978 | Weatherly et al. | 427/34 |
| 4,125,757 | 11/1978 | Ross | 219/121 L |
| 4,128,752 | 12/1978 | Gravel | 219/121 L |
| 4,219,721 | 8/1980 | Kamen et al. | 219/121 LM |
| 4,250,374 | 2/1981 | Tani | 219/121 LE |
| 4,289,447 | 9/1981 | Sterman et al. | 415/200 |
| 4,313,760 | 2/1982 | Dardi et al. | 428/632 |
| 4,319,122 | 3/1982 | Pope et al. | 219/121 LC |
| 4,321,311 | 3/1982 | Strangman | 428/623 |
| 4,324,972 | 4/1982 | Furrer et al. | 219/121 FS |
| 4,328,410 | 5/1982 | Slivinsky et al. | 219/121 LJ |
| 4,335,190 | 6/1982 | Bill et al. | 428/623 |
| 4,368,080 | 1/1983 | Langen et al. | 134/1 |
| 4,405,660 | 9/1983 | Ulion et al. | 427/248.1 |
| 4,411,730 | 10/1983 | Fishter et al. | 156/626 |
| 4,617,085 | 10/1986 | Cole, Jr. et al. | 156/643 |
| 4,645,716 | 2/1987 | Harrington et al. | 428/472 |
| 4,720,621 | 1/1988 | Langen | 219/121 L |
| 4,738,602 | 4/1988 | Yamamoto et al. | 418/113 |
| 4,745,018 | 5/1988 | Chihara et al. | 428/141 |
| 4,756,765 | 7/1988 | Woodroffe | 134/1 |
| 4,774,393 | 9/1988 | Tarumoto et al. | 219/121.69 |
| 4,803,021 | 2/1989 | Werth et al. | 264/25 |
| 4,885,213 | 12/1989 | Miyamoto et al. | 428/612 |
| 4,970,366 | 11/1990 | Imatou et al. | 219/121.68 |
| 4,994,639 | 2/1991 | Dickinson et al. | 219/121.69 |

OTHER PUBLICATIONS

"Metals Handbook", Ninth edition, vol. 5, TA 472. A3 1982, pp. 307–309, 367–368.

(List continued on next page.)

Primary Examiner—Michael Lewis
Assistant Examiner—N. M. Nguyen
Attorney, Agent, or Firm—Jerome C. Squillaro; David L. Narciso

[57] ABSTRACT

An article having a substrate is protected by a thermal barrier coating system. An interfacial layer contacts the upper surface of the substrate. The interfacial layer may comprise a bond coat only, or a bond coat and an overlay coat. The interfacial layer has on its upper surface a preselected, controllable pattern of three-dimensional features, such as grooves in a parallel array or in two angularly offset arrays. The features are formed by an ablation process using an ultraviolet laser such as an excimer laser. A ceramic thermal barrier coating is deposited over the pattern of features on the upper surface of the interfacial layer.

11 Claims, 4 Drawing Sheets

OTHER PUBLICATIONS

Excuner Beam Applications, *Proceedings of SPIE-The International Society for Optical Engineering,* Vol. 998, J. Sercel, U. Sowada, H-J Kahlert, D. Basting, L. Austin Sep. 1988.

Ablation of Polymers with Pairs of Ultraviolet Laser Pulses with Controlled Temporal Separation, *SPIE,* vol. 1023, R. Srinivasan and Bodil Braren, 1988 (no month).

Excimer Laser Surface Treatment of Non-Ferrous Alloys, *SPIE,* vol. 1023, M. Georgopoulos, E. Hontzopoulos and C. Fotakis, 1988 (no month).

Excimer Laser Processing of Ceramic Workpieces—Results and Physical Processis, *Lambda Industrial No. 6,* Jun. 1989, U. Sowada, P. Lokai, H-J. Kahlert, D. Basting.

Excimer Laser Material Processing—Methods and Results, *Lambda Industrial No. 4,* Oct. 1988, U. Sowada, H-J. Kahlert and D. Basting.

Delivery of Excimer Laser Beams Through Optical Fibers, *Lambda Highlights No. 6,* Aug. 1987.

New Superconductors: Thin Films Using Excimer Laser, *Lambda Highlights No. 7,* Oct. 1987.

Submicron Drilling Through Refractory Metals, *Lambda Highlights No. 2,* Dec. 1986.

Excimer Lasers with Magnetic Switch Control, *Lambda Physik, Lasertechnik. Lasertechnik. (no date).*

Scan Marking: Application to Metal Marking, *Lambda Highlights No. 3,* Feb. 1987.

Glass Marking: *Lambda Highlights No. 1,* Oct. 1986.

Material Processing with Excimer Lasers, *Lambdaphysik* (no date).

Lambda Lasers, The UV-Tool for Industrial Applications, *Lambdaphysik,* May 1989.

ENHANCED THERMAL BARRIER COATING SYSTEM

BACKGROUND OF THE INVENTION

This invention relates to a thermal barrier coating system having enhanced resistance to spallation, and, more particularly, to such a system wherein adhesion is enhanced and crack propagation is reduced by physical modification of at least one surface underlying the ceramic thermal barrier coating.

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of hot gas turns the turbine, which turns the shaft and provides power to the compressor. The hot exhaust gases then flow from the back of the engine, driving it and the aircraft forwardly.

The hotter the exhaust gases, the more efficient is the operation of the jet engine. There is thus an incentive to raise the exhaust gas temperature. However, the maximum temperature of the exhaust gases is normally limited by the materials used to fabricate the turbine vanes and turbine blades of the turbine. In current engines, the turbine vanes and blades are made of superalloys, and can operate at temperatures of up to about 1900°–2100° F. As used herein, the term superalloy includes high-temperature-resistant alloys based on nickel, cobalt, iron or combinations thereof.

Many approaches have been used to increase the operating temperature limit of the turbine blades and vanes, and other components of the engine that operate at high temperatures. The composition and processing of the materials themselves have been improved. Physical cooling techniques are used. In one widely used approach, internal cooling channels are provided within the components, and cool air is forced through the channels during engine operation.

To provide a further increase in the operating temperature limit, a thermal barrier coating system is applied to the turbine blade or turbine vane, which acts as a substrate. The thermal barrier coating system includes a ceramic thermal barrier coating that insulates the component from the hot exhaust gas, permitting the exhaust gas to be hotter than would otherwise be possible with the particular material and fabrication process of the component. Ceramic thermal barrier coatings usually do not adhere well directly to the superalloys used in the substrates, and therefore an additional layer called a bond coat is typically placed between the substrate and the thermal barrier coating. The bond coat improves the adhesion, and, depending upon its composition and processing, may also improve oxidation and corrosion resistance of the substrate.

The thermal barrier coating system must remain in place on the protected component to be useful. When the component is repeatedly heated and cooled, as occurs in the operating cycles of the gas turbine engine, thermally induced stresses and strains are produced and accumulate within the thermal barrier coating system due to the different thermal expansion coefficients of the ceramic thermal barrier coating and the metallic substrate to which it is applied. The bond coat helps to alleviate the buildup of stresses and strains, but they are present. The bond coat also improves the adhesion of the thermal barrier coating by improving the oxidation resistance of the substrate.

The most common mechanism of failure of the thermal barrier coating system is the spallation of the coating in local regions of the protected component. A crack is produced in the thermal barrier coating due to the accumulation of stresses and strains. The crack eventually propagates until a portion of the coating system flakes or chips away, this process being termed "spallation". Such spallation failure usually occurs in patches. With the thermal barrier coating system locally removed, the underlying component is exposed to the hot exhaust gas temperatures, above which the unprotected component can not operate, and failure of the component quickly follows.

A number of techniques have been developed to reduce the tendency toward spallation failure of the thermal barrier coating. These techniques include optimization of compositions of the various layers, optimization of processing, adding new layers to the bond coat, and changes in design of the underlying components. The various approaches have been successful to varying degrees, but also involve drawbacks such as increased weight, constraints on design, and manufacturing complexity. Although progress has been made, the problem of spallation failure of thermal barrier coating systems remains.

There is therefore a need for an improved approach to improving the resistance to spallation failure of components protected by thermal barrier coating systems. The approach should be operable to extend the life of the protected component, and should be compatible with commercial production of engine components. The present invention fulfills this need, and further provides related advantages.

SUMMARY OF THE INVENTION

This invention provides an improved thermal barrier coating system and protected component. The approach of the invention increases the life of the component before the onset of spallation failure. In some instances, it may reduce the weight of the component, a particularly important consideration for a rotating component such as a turbine blade. The approach of the invention is compatible with other techniques to extend the life of the thermal barrier coating system, such as structural and compositional changes. The manufacturing of the blade requires an additional step, but this step is performed in an automated apparatus.

In accordance with the invention, an article protected by a thermal barrier coating system comprises at least a substrate having a substrate upper surface and a ceramic thermal barrier coating. An interfacial layer having an interfacial layer upper surface is optionally applied between the substrate upper surface and the ceramic thermal barrier coating. A preselected, controllable pattern of three-dimensional features is applied to the substrate upper surface, the interfacial layer upper surface, or both.

Spallation failures occur when a crack is initiated in the thermal barrier coating system, typically in the interfacial layer or at one of the surfaces such as the aluminum oxide layer that grows on the interfacial layer and intermediate between it and the thermal barrier coating. The crack then propagates with increasing numbers of thermal cycles in a plane generally parallel to the surface of the substrate. Eventually, a small portion of the aluminum oxide, and any portion of the thermal barrier coating system located on it, is liberated from the substrate, leading to a failure of the thermal barrier coating system.

The present approach accepts the initiation of cracks in such a system. Rather than attempt to avoid such cracks entirely, the structure produced by the present technique seeks to arrest the propagation of the cracks by placing obstacles to crack propagation into the thermal barrier coating system. It will be understood, however, that the present approach may be used in conjunction with other techniques that seek to minimize crack initiation, the various techniques working together to prolong the life of the protected article.

The obstacles are three-dimensional features that deflect the crack tip and cause it to pass through phase boundaries which impede the progress of the crack. The result is that, while cracks may initiate, their propagation that leads to failure is impeded. The life of the thermal barrier coating system prior to spallation is thereby lengthened.

The three-dimensional features of the invention are present in a selectable, controllable pattern at the surface of the substrate or the interfacial layer. In the past, it has been known to have a high degree of surface roughness to improve the adherence of the thermal barrier coating to the interfacial layer. That roughness is produced by the mode of deposition or by chemical etching the surface. That prior approach is distinguished from that of the present invention by the selectability and controllability of the type of the three-dimensional features and the pattern of the features in the present invention. Selectability and controllability of the type and pattern of the features is important, as optimum crack-impeding geometries can be selected.

The three-dimensional features may be produced by many different methods. For example, a high energy beam such as a laser beam or an electron beam may be directed against the surface to which the pattern is to be applied; by moving the beam relative to the surface, a groove is created. Micromachining processes, in which one or more cutting tools are dragged over the surface, can provide an array of features. Abrasive flow machining is another form of micromachining. An engraving process in which selected portions of the surface are coated with etch-resistant material and the surface is then exposed to a suitable etchant also produces such three-dimensional features. The etch-resistant material may be applied by silk screening or lithography. Conventional photoengraving, in which photosensitive etch-resistant material is applied to the entire surface, locally sensitized by exposure to light passing through a mask, and chemically developed to form the preselected pattern, may be used. Where the surface to which the pattern is to be applied has an irregular shape, it may be more convenient to move the surface, previously coated with photosensitive etch-resistant material, under a stationary laser beam to achieve sequential exposure to the sensitizing light. There is an important distinction between etching in these engraving processes, where only selected portions of the surface are exposed to the etchant, and conventional chemical etching, in which the entire surface is exposed to the action of the etchant.

The preferred method for forming the three-dimensional features is a pulsed directed energy beam that ablates material from the surface against which it is directed. A pulsed excimer laser, operating in the ultraviolet range with pulses in the range of tens of nanoseconds duration, may be used. Such a laser is used to form the three-dimensional features by ablating material to be removed, in a way that has virtually no effect on the underlying material that is not removed. A clean pattern is formed, without introducing contamination, as sometimes occurs with conventional chemical etching, or cracks in the underlying material, as occurs with some other methods.

The three-dimensional features are preferably grooves. The grooves are preferably arranged parallel to each other in a pattern. With the excimer laser approach, arrays of grooves oriented at an angle to each other can be prepared. Other types of three-dimensional features such as dimples can also be used. The formation of the features by a directed energy beam permits great flexibility. One type of pattern or feature can be used in some areas, another type in another area, and none in yet other areas on the surface of the substrate.

The present invention provides an advance in the art of articles protected by thermal barrier coatings. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
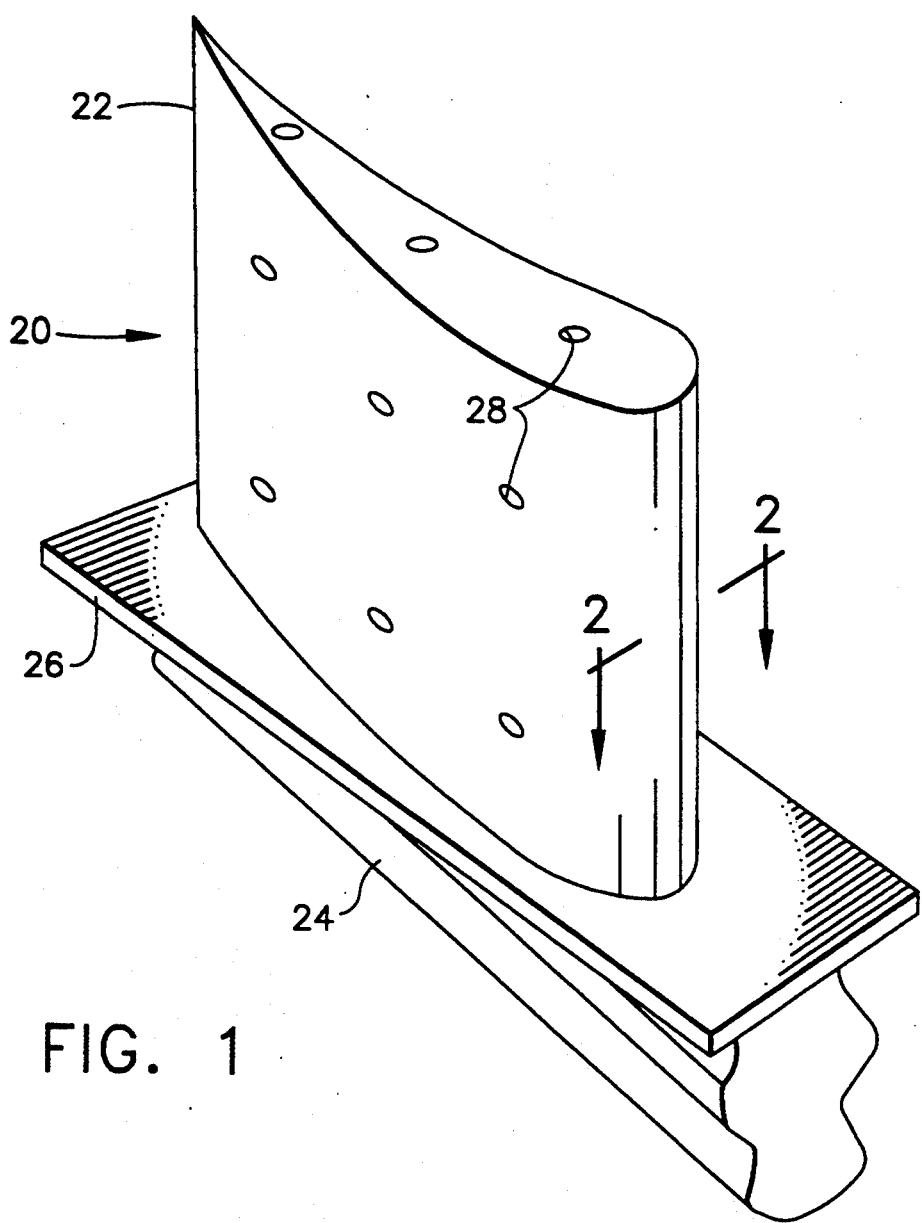
FIG. 1 is a perspective view of a gas turbine component.

FIG. 1 depicts a component of a gas turbine engine such as a turbine blade or turbine vane, in this case a turbine blade 20, typically made of a nickel-base superalloy. The turbine blade 20 includes an airfoil 22 against which the flow of hot exhaust gas is directed. The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. A number of cooling channels desirably extend through the interior of the airfoil 22, ending in openings 28 in the surface of the airfoil 22. A flow of cooling air is directed through the cooling channels, to reduce the temperature of the airfoil 22.

Figure 2:
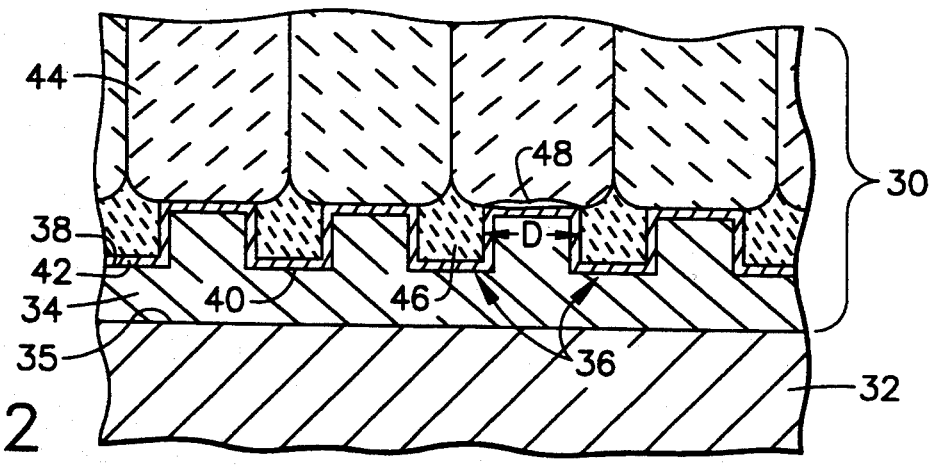
FIG. 2 is a sectional view through the component of FIG. 1, taken generally along line 2—2, illustrating one embodiment of a thermal barrier coating system on the surface of the component.

The airfoil 22 of the turbine blade 20 is protected by a thermal barrier coating system 30, one embodiment of which is illustrated in FIG. 2. The process leading to this structure is depicted in block diagram form in FIG. 3. A substrate 32 is provided, numeral 50 of FIG. 3. The substrate 32 is typically a turbine blade 20, turbine vane, or other component of the high temperature regions of a gas turbine engine. The substrate 32 is prepared by any operable technique, preferably casting as a single crystal or oriented polycrystal.

The thermal barrier coating system 30 is deposited upon the substrate 32. A bond coat layer 34 is deposited upon an upper surface 35 of the substrate 32, numeral 52 of FIG. 3. The bond coat is preferably from about 0.003 to about 0.008 inches thick, and is formed of any of several types of bond coat that are known in the art, such as aluminides, MCrAlY coatings or nickel-base alloys of different composition than the airfoil 22. A preferred nickel-base alloy is that disclosed in U.S. Pat. No. 5,043,138, whose disclosure is incorporated by reference. This alloy has a nominal composition, in weight percent, as set forth in the '138 patent, of 1–10% Co, 6–12% Cr, 5–8% Al, 1–10% Ta, 1–10% W, 0–3% Re, 1–2% Mo, 0.1–2% Hf, 0.005–0.1% B, 0.005–0.25% C, 0.001–1.0% Y, balance nickel and incidental impurities.

A pattern 36 of three-dimensional features is formed on an upper surface 38 of the bond coat 34. In the embodiment pictured in FIG. 2, the features are square-bottomed grooves 40, produced by ablation of a portion of the bond coat 34, numeral 54 of FIG. 3. The pattern 36 is a parallel array of the grooves 40.

Figure 4:
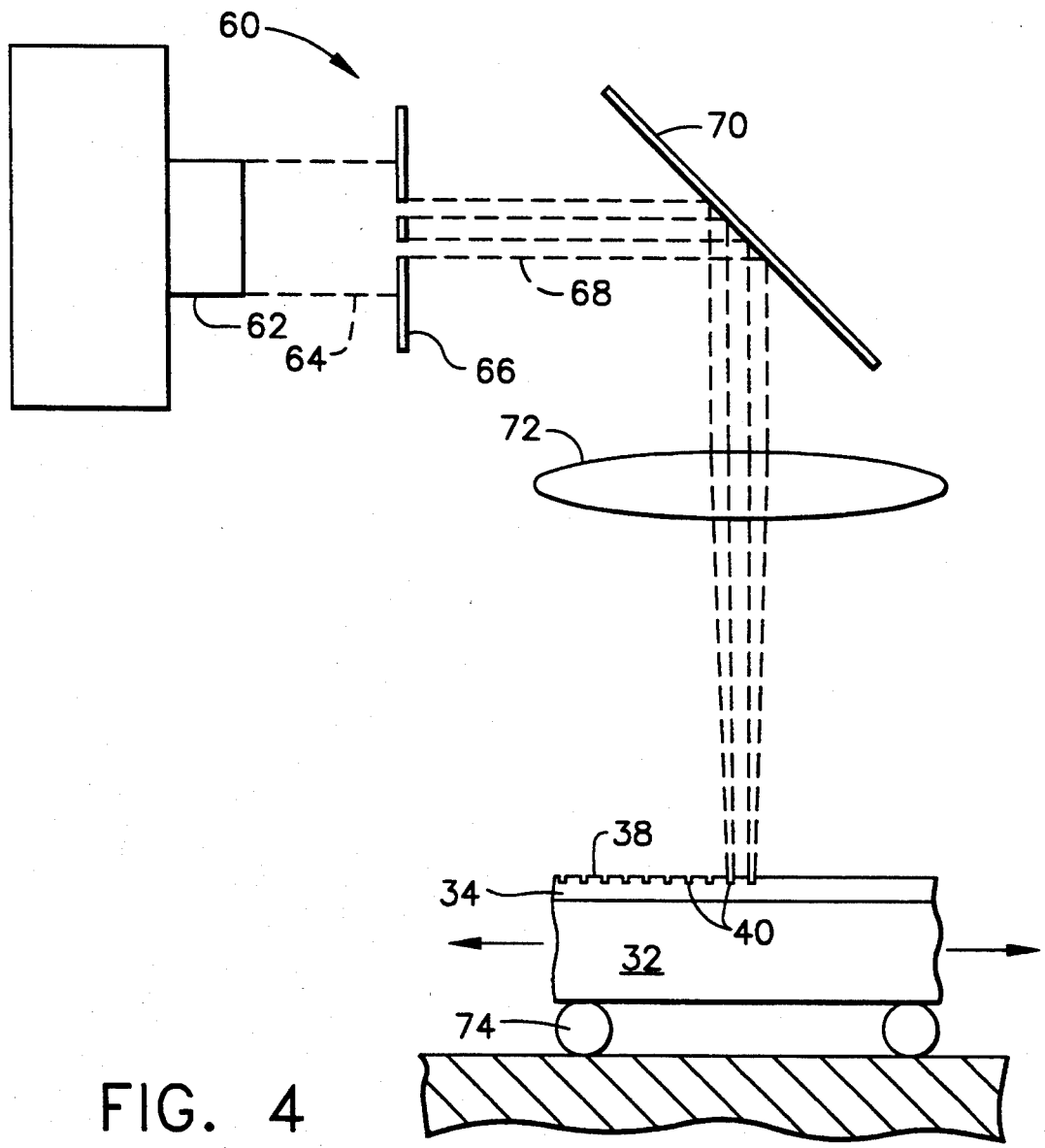
FIG. 4 is a schematic diagram of an excimer laser apparatus for forming the pattern of three-dimensional features.

An apparatus 60 for removing bond coat material by ablation to form the grooves 40 is illustrated in FIG. 4. The apparatus 60 includes an ultraviolet excimer laser 62 that produces very short pulses, typically about 10–30 nanoseconds (ns) in duration, of energy at a wavelength of from about 193–351 nanometers (nm). Corresponding photon energies are about 6.4–3.5 electron volts (eV).

The laser 62 produces a laser beam 64, which is passed through a mask 66 to define a patterned beam 68. The mask defines the shape and lateral spacing of the grooves 40, while their lengthwise extent is determined by a translation mechanism to be discussed subsequently. The patterned beam 68 is directed toward the substrate 32 and the bond coat 34 to be ablated by an optical system, here represented as a mirror 70 and a lens 72. The lens 72 focuses the patterned beam 68 to a reduced size and onto the upper surface 38 of the bond coat 34.

The position of the focused beam on the upper surface 38 is established and controlled by the movement of the substrate 32 in a two-dimensional translation mechanism, indicated schematically at numeral 74. The translation mechanism 74 moves the substrate 32 in the direction out of the plane of the page of FIG. 4 to form the long direction of the grooves 40. After the full length of the groove 40 is formed, the translation mechanism 74 is incremented to move the entire substrate 32 to the left in the view of FIG. 4, so that another set of grooves can be formed.

The use of an ultraviolet, short pulse duration laser such as the excimer laser has important advantages in the present application. Most substrates absorb more energy in the ultraviolet range than in the visible or infrared ranges. The very short pulse duration, high intensity laser beam removes material by direct vaporization rather than by melting and vaporization, as occurs for lasers producing longer pulses. Material is removed from the target in small increments, typically a fraction of a micrometer per pulse. An important beneficial side effect is that little heat is transferred to the substrate. There is little tendency for the substrate to warp or crack as a result of the laser ablation processing.

This processing permits the grooves 40 and pattern 36 to be controlled very precisely. The shape of the groove 40 is controlled by the shape of the openings in the mask. The depth of the groove 40 is readily controlled to a precise, preselected value by the number of laser pulses directed into an area. The nature and extent of the pattern 36 is also readily controlled precisely to a preselected form, by controlling the movement of the translation mechanism 74. In the described embodiment, an array of parallel grooves is formed. It is also possible to form two intersecting arrays of parallel grooves by rotating the substrate slightly. Other patterns can also be formed, as required.

Another method of generating grooves having the desired pattern is by conventional photoengraving. One available commercial process is positive photoresist, available from Eastman Kodak. In this process, the surface to be grooved or etched is coated with a solution of a photosensitized polymeric material such as a novalak resin. The solvent is removed by drying leaving a thin film resin residue on the surface. The film thickness has a thickness of less than about one mil and may be as thin as one micron. The coated surface is then exposed to a light pattern, for example by exposure to a laser. An alternative light exposure method is applying an opague mask having transmissive regions in the desired pattern and exposing the coated surface to light. Once the coated surface has been exposed to light in the desired pattern, the exposed areas are then more soluble upon exposure to a developer solution, which is then applied. This developer solution, typically a sodium carbonate solution or other mildly caustic solution, causes dissolution of the polymeric film in the pattern which has been exposed to light. The surface is then washed with water to remove the caustic solution. The surface is then heated to a temperature of about 115°–130° C., preferably about 120° C., to cross-link the polymer remaining on the surface and to dry the surface. The surface is then etched with a suitable reagent, usually an acid, to the desired depth. The acid only attacks the regions of the surface where the film has been dissolved, the cross-linked film remaining being impervious to the reagent. Upon reaching the desired depth the reagent is neutralized by the application of water, and the surface is washed. The remaining film is then removed, such as by a solvent dissolution method. The result is a surface having the desired grooves. This photoetching technique may be utilized to generate the desired pattern on the surface of the substrate or on the surface of any intermediate layers.

Another method for generating the desired pattern is by micromachining. Micromachining is accomplished by scribing the surface to be grooved with a fine diamond-tipped or carbide-tipped machine tool. The machine tool tip has a radius of one mil or less to yield the required fine grooves. The groove pattern can be readily controlled by numerically-controlled or computer-controlled machines.

Returning to FIG. 2, after the pattern 36 of features is furnished, the exposed upper surface 38 of the grooved pattern may be oxidized, numeral 56 of FIG. 4, to produce an aluminum oxide scale 42. Instead, there may be no oxidation step and the oxidation may occur during the next step.

Figure 3:
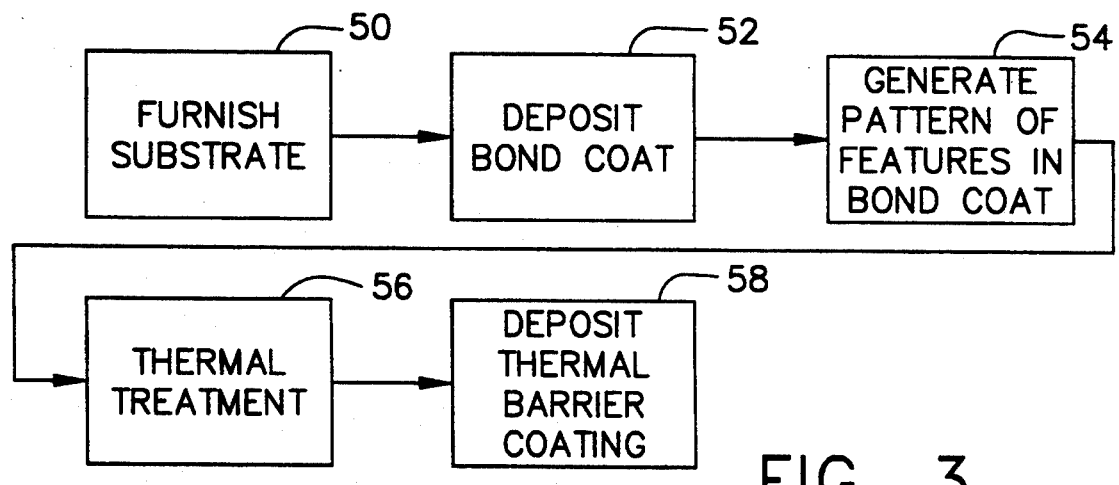
FIG. 3 is a block diagram of the embodiment of the approach of the invention which produces the structure of FIG. 2.

A thermal barrier coating 44 is applied to the upper surface 38 of the bond coat 34, numeral 58 of FIG. 3. The thermal barrier coating 44 may be any acceptable heat insulating material, but desirably is yttria-stabilized zirconia, having a composition of from about 6 to about 20 weight percent yttrium oxide, balance zirconium oxide. The thermal barrier coating 44 is preferably from about 0.003 to about 0.015 inches thick.

The structure between the substrate 32 and the thermal barrier coating 44 is termed herein the "interfacial layer". The details of the structure of the interfacial layer may vary, as will be discussed in relation to subsequent embodiments.

The thermal barrier coating 44 may be applied by any operable technique, such as thermal spraying or vapor deposition. These deposition techniques are known in the art. For the embodiment of FIG. 2, physical vapor deposition is preferred.

The thermal barrier coating 44 typically deposits as a series of columnar grains oriented perpendicularly to the surface 35 of the substrate 32. The columnar structure may extend into the grooves 40, or may terminate above the grooves 40, as shown. In that case, a somewhat more irregular ceramic structure 46, of the same material as the thermal barrier coating 44, is found in the grooves 40.

The structure of the thermal barrier coating system 30 impedes the propagation of cracks in the thermal barrier coating system. If, during service, a crack 48 forms in the region between the bond coat 34 and the thermal barrier coating 44, the crack 48 can propagate only to the extent of one pitch D between the grooves 40 before encountering an interface that impedes the propagation of the crack. The region of irregular ceramic 46 also aids in arresting the movement of the crack 48. By contrast, in a conventional planar interface thermal barrier coating system, the crack can propagate much longer distances before it is stopped, and may in fact cause spallation failure of the thermal barrier coating 44 before it can be stopped. A crack at the bottom of the groove 40 is similarly arrested before it can propagate substantial distances.

Those who design components such as the turbine blade 20 can calculate the stresses during service at the surface of the components. That information in turn is used to predict the probable direction of crack propagation during service. The pattern 36 of grooves or other features is oriented on the component to have the maximum effect in arresting crack propagation. The ability to furnish a preselected, controllable pattern of features is therefore an important advantage of the present invention. Other techniques, such as grit blasting or chemical etching, cannot produce such controllable patterns in a preselected form as readily.

Figure 5:
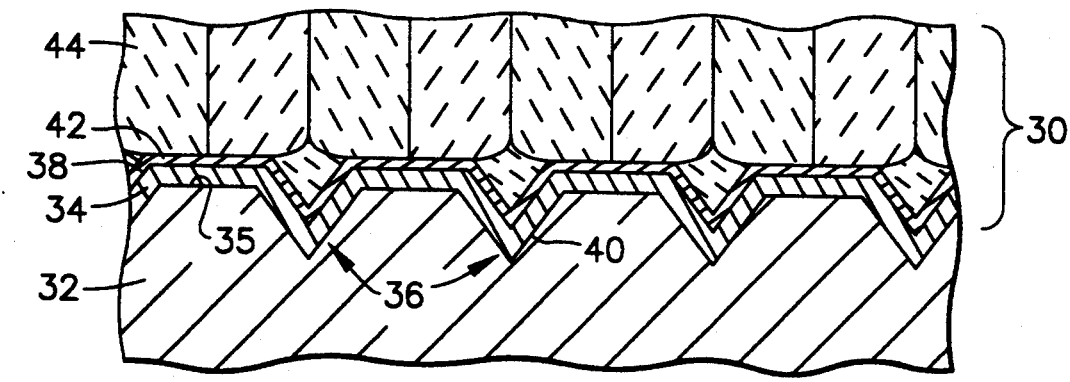
FIG. 5 is a sectional view similar to that of FIG. 2, illustrating another embodiment of the thermal barrier coating system.
Figure 6:
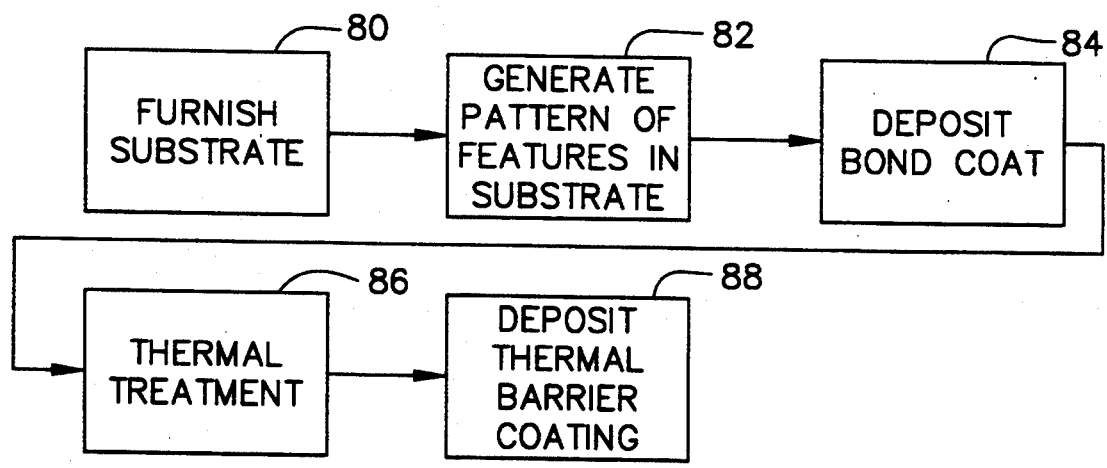
FIG. 6 is a block diagram of the embodiment of the approach of the invention which produces the structure of FIG. 5.

Other embodiments of the present invention can be prepared by varying the basic structure and procedure just discussed. Another embodiment is illustrated in FIG. 5, and its preparation is illustrated in FIG. 6. In this instance, the substrate is furnished, numeral 80 of FIG. 6, by the same approach as discussed for the step 50 of FIG. 3. The pattern 36 of features is formed by ablation of the upper surface 35 of the substrate 32, numeral 82 of FIG. 6. In this instance, a series of V-grooves 40 is formed, rather than flat bottom grooves shown in FIG. 3. The procedure for forming the pattern 36 is the same as for the ablation step 54 of FIG. 3, except that a mask 66 with V-shaped openings is used. The difference between this approach and that of FIGS. 3 and 4 is that here the pattern 36 is formed directly in the substrate surface 35, rather than the bond coat surface 34.

The bond coat 34 is deposited onto the upper surface 35 of the substrate 32, numeral 84 of FIG. 6. A procedure like that of the deposition step 52 of FIG. 3 is used. Because of the presence of the grooves 40 in the substrate upper surface 35, the upper surface 38 of the bond coat 34 also has the grooved pattern. The upper surface 38 of the bond coat is oxidized to form an oxide scale 42, numeral 86 of FIG. 6, by an approach like that used for step 56 of FIG. 3. The resulting interfacial layer of bond coat 34 and oxidized scale 42 has a three-dimensional pattern on its upper surface, producing the same beneficial crack arresting properties as discussed previously. The thermal barrier coating 44 is deposited over the bond coat upper surface 38, numeral 88 of FIG. 6, by the same approaches as discussed for the deposition 58 of FIG. 3.

In a related embodiment of the invention, the step of applying the bond coat 34 to the substrate 32, numeral 84 of FIG. 6, may be omitted, and the ceramic thermal barrier coating 44 is then applied directly to the substrate 32.

Figure 7:
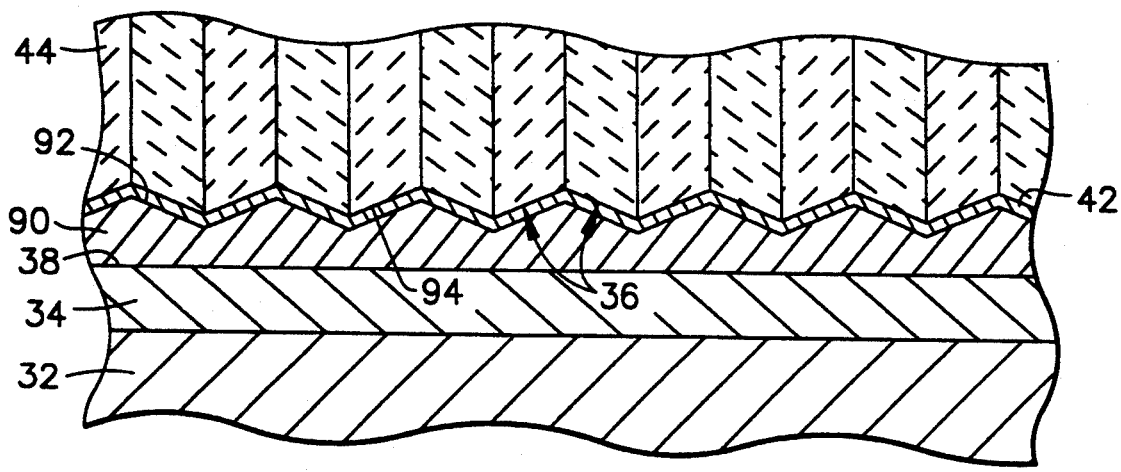
FIG. 7 is a sectional view similar to that of FIG. 2, illustrating another embodiment of the thermal barrier coating system.
Figure 8:
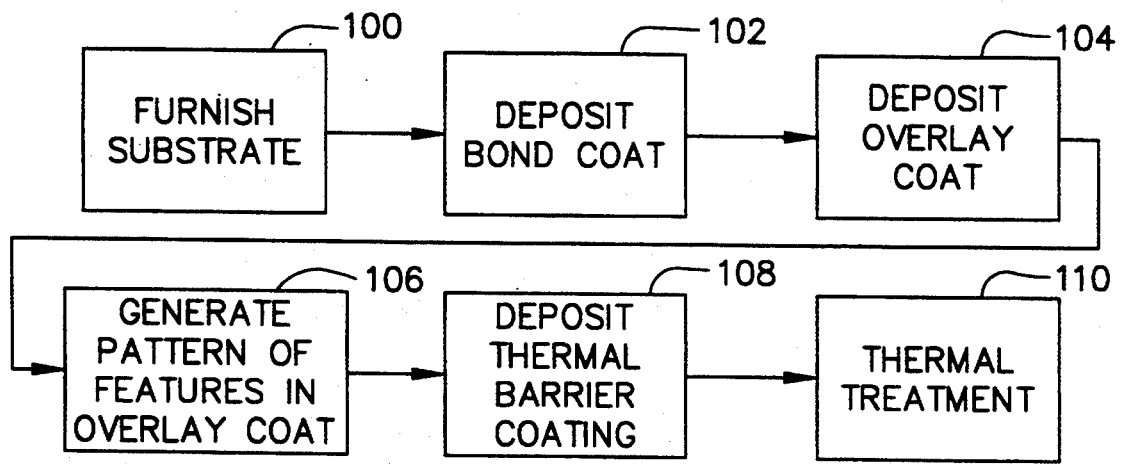
FIG. 8 is a block diagram of the embodiment of the approach of the invention which produces the structure of FIG. 7.

Another embodiment of the invention is illustrated in FIG. 7, and its method of preparation in FIG. 8. The structure and method are similar to that discussed previously, except in this case another coating layer, the overlay coat, is part of the interfacial layer. The patterning is performed in the overlay coat.

In this embodiment, the substrate 32 is furnished, numeral 100 of FIG. 8, and the bond coat is deposited, numeral 102 of FIG. 8, by the same procedures as discussed in relation to the steps 50 and 52 of FIG. 3. An overlay coat 90 is deposited on the upper surface 38 of the bond coat 34. The overlay coat 90 is preferably an aluminum-rich metallic material such as a platinum aluminide or a nickel aluminide. The overlay coat 90 has a thickness of from about 0.002 to about 0.008 inches, and is preferably deposited by plating and/or aluminiding by chemical vapor deposition or physical vapor deposition, numeral 104 of FIG. 8.

A pattern 36 of three-dimensional features is formed in an upper surface 92 of the overlay coat 90, numeral 106 of FIG. 8, by the same procedures as discussed in relation to the step 54 of FIG. 3. In the embodiment of FIG. 8, the pattern is a series of dimples 94 rather than grooves. Such variations in the features are readily accomplished using the apparatus 60. The dimples 94 are three-dimensional features, similar in this respect to the grooves 40, and therefore afford similar crack-arresting advantages. The thermal barrier coating 44 is deposited on the upper surface 92 of the overlay coat 90, numeral 108 of FIG. 8. The approaches used for the step 58 of FIG. 3 may be used for the step 92. In this instance, the article is oxidized to form the scale 42, numeral 110 of FIG. 8, after the thermal barrier coating is deposited. This variation in the order of oxidation is possible because oxygen can diffuse through the thermal barrier coating 44 to the upper surface 92 of the overlay coat 90, and possibly to the upper surface 38 of the bond coat 34 if the overlay coat 90 does not provide a sufficient barrier.

The advantages and mode of operation of the present invention are illustrated in the following examples.

EXAMPLE 1

The desirable effect of using the present approach has been experimentally verified using button samples and a simulated service thermal cycling test. Button specimens were prepared from a directionally solidified superalloy whose nominal composition, in weight percent, was 12% Co, 6.8% Cr, 6.1% Al, 6.4% Ta, 5% W, 1.5% Mo, 2.8% Re, 1.5% Hf, 0.12% C, 0.015% B, balance Ni and incidental impurities. The specimens were aluminided to a depth of about 0.002 inches, using the well-known pack codeposition process, thereby forming an aluminide interfacial layer. A pattern of three-dimensional features, in the form of a square grid of grooves having a nominal width and depth of 0.0005 inch, was formed into the surface of the aluminide interfacial layer, using an excimer laser, as illustrated in FIGS. 3 and 4. The spacing of the grooves was about 0.005 inch. A ceramic thermal barrier coating of zirconia containing about 8 percent yttria was applied to the specimens by plasma arc spraying. The ceramic layer was about 0.009 inch thick.

Another set of specimens, exactly the same as those just described except that no three-dimensional features were formed into the aluminide interfacial layer, was also prepared.

Both sets of specimens were placed into a thermal cycling apparatus wherein they were subjected to periodic heating and cooling cycles. In each cycle, the specimens were heated to a temperature of 2000° F. in 9 minutes, held at 2000° F. for 45 minutes, and cooled to below 200° F. in 10 minutes. The specimens were inspected every 20 cycles. Failure was defined as the number of cycles required before 20 percent of the surface of the specimen had lost its thermal barrier coating by spallation.

The following table presents the results of the thermal cycling tests:

TABLE I

| Sample Description | | Cycles to Failure |
|---|---|---|
| 3-Dimensional Features | #1 | 480 |
| | #2 | 600 |
| | #3 | 560 |
| No 3-Dimensional Features | #1 | 100 |
| | #2 | 20 |
| | #3 | 180 |

The three-dimensional features raised the number of thermal cycles to failure by a factor of about 5.5.

EXAMPLE 2

Another set of button specimens were prepared from a single crystal superalloy whose nominal composition, in weight percent, was 7.5% Co, 7% Cr, 6.2% Al, 6.5% Ta, 5% W, 1.5% Mo, 3% Re, 0.15% Hf, 0.12% C, 0.3% Y, balance Ni and incidental impurities. The specimens were aluminided to a depth of about 0.002 inches, using the well-known pack codeposition process, thereby forming an aluminide interfacial layer. A pattern of three-dimensional features, in the form of a square grid of grooves having a nominal width and depth of 0.0003 inch, was formed into the surface of the aluminide interfacial layer on one half of the surface of each specimen, using an excimer laser, as illustrated in FIGS. 3 and 4. The spacing of the grooves was about 0.005 inch. A ceramic thermal barrier coating of zirconia containing about 8 percent yttria was applied to the specimens by physical vapor deposition. The ceramic layer was about 0.005 inch thick.

The specimens were placed into a thermal cycling apparatus wherein they were subjected to periodic heating and cooling cycles. In each cycle, the specimens were heated to a temperature of 2075° F. in 9 minutes, held at 2075° F. for 45 minutes, and cooled to below 200° F. in 10 minutes.

The following table presents the results of the thermal cycling tests:

TABLE II

| Sample Description | | Cycles to Failure |
|---|---|---|
| 3-Dimensional Features | #1 | 380 |
| | #2 | 600 |
| No 3-Dimensional Features | #1 | 240 |
| | #2 | 300 |

The three-dimensional features raised the number of thermal cycles to failure by a factor of about 2.

The present approach accommodates a number of equivalent variations. The arrangement of the layers, the pattern, the nature of the features, and other structural parameters can be readily varied, and the structures shown are illustrative of the preferred approaches, not limiting of the invention. Thus, this invention has been described in connection with specific embodiments and examples. However, it will be readily recognized by those skilled in the art the various modifications and variations of which the present invention is capable without departing from its scope as represented by the appended claims.

What is claimed is:

1. An article protected by a thermal barrier coating system, comprising
    substrate means for supporting a thermal barrier coating, the substrate means having a shape selected from the group consisting of a turbine blade and a turbine vane and further having a substrate means upper surface with a preselected pattern of three-dimensional features wherein the preselected pattern has a crack-impeding geometry, and wherein the features are grooves in a direction lying in the plane of the substrate means upper surface; and
    a thermal barrier coating contacting the substrate upper surface.

2. The article of claim 1, additionally comprising an interfacial layer having an interfacial layer upper surface, wherein the interfacial layer contacts the substrate upper surface and the thermal barrier coating contacts the interfacial layer upper surface.

3. An article protected by a thermal barrier coating system, comprising
    a substrate having a substrate upper surface;
    an interfacial layer contacting the substrate upper surface and having an interfacial layer upper surface, the interfacial layer having on the interfacial layer upper surface, but not on the upper surface of the substrate, a preselected pattern of three-dimensional features wherein the preselected pattern has a crack-impeding geometry, wherein the three-dimensional features are selected from a group consisting of grooves and dimples; and a thermal barrier coating contacting the interfacial layer upper surface.

4. An article protected by a thermal barrier coating system, comprising a substrate having a substrate upper surface;

an interfacial layer contacting the substrate upper surface and having an interfacial layer upper surface, wherein the upper surface of the substrate and the upper surface of the interfacial layer have a preselected pattern of three-dimensional features, wherein the features are grooves, and further wherein the preselected pattern has a crack-impeding geometry; and a thermal barrier coating contacting the interfacial layer upper surface.

5. The article of claim 3, wherein the interfacial layer comprises a metallic bond coat having a bond coat upper surface, and an overlay coat contacting the bond coat upper surface and having an overlay coat upper surface.

6. The article of claim 5, wherein the three-dimensional features are present in the bond coat upper surface and the overlay coat upper surface.

7. The article of claim 5, wherein the bond coat upper surface is smooth and the three-dimensional features are present in the overlay coat upper surface.

8. An article as in claim 1 or claim 3, wherein the substrate is made of a superalloy.

9. An article as in claim 3, wherein the substrate is in the form of a component of a gas turbine engine.

10. An article as in claim 1 or claim 3, wherein the three dimensional features are produced by removal of material by a high-energy beam.

11. An article as in claim 2 or claim 3, wherein the interfacial layer comprises a metallic bond coat.

* * * * *